(12) United States Patent
Ma et al.

(10) Patent No.: US 12,447,993 B2
(45) Date of Patent: Oct. 21, 2025

(54) SYSTEMS AND METHODS FOR UNCERTAINTY ESTIMATION IN VEHICLE TRAJECTORY PREDICTION

(71) Applicant: Honda Motor Co., Ltd., Tokyo (JP)

(72) Inventors: Hengbo Ma, Albany, CA (US); Manh Trung Huynh, Santa Clara, CA (US); Chiho Choi, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 212 days.

(21) Appl. No.: 18/101,399

(22) Filed: Jan. 25, 2023

(65) Prior Publication Data

US 2023/0373519 A1 Nov. 23, 2023

Related U.S. Application Data

(60) Provisional application No. 63/343,988, filed on May 19, 2022.

(51) Int. Cl.
 *B60W 60/00* (2020.01)
 *B60W 40/04* (2006.01)
 *G06N 3/08* (2023.01)
(52) U.S. Cl.
 CPC .......... *B60W 60/001* (2020.02); *B60W 40/04* (2013.01); *G06N 3/08* (2013.01); *B60W 2556/20* (2020.02); *B60W 2556/45* (2020.02)
(58) Field of Classification Search
 None
 See application file for complete search history.

(56) References Cited

U.S. PATENT DOCUMENTS

2020/0089246 A1\* 3/2020 McGill, Jr. .......... G05D 1/0221

FOREIGN PATENT DOCUMENTS

EP 3839830 A1 \* 6/2021 ............... G06N 3/04

OTHER PUBLICATIONS

Alexandre Alahi, Kratarth Goel, Vignesh Ramanathan, Alexandre Robicquet, Li Fei-Fei, and Silvio Savarese. Social lstm: Human trajectory prediction in crowded spaces. In Proc. IEEE Conf. Comput. Vision and Pattern Recognit., pp. 961-971, 2016.

(Continued)

*Primary Examiner* — Abby J Flynn
*Assistant Examiner* — Bakari Underwood
(74) *Attorney, Agent, or Firm* — Rankin, Hill & Clark LLP (57) ABSTRACT

Systems and methods for uncertainty estimation in vehicle trajectory prediction are provided. In one embodiment, a method includes calculating predicted error scores for each static data point of a set of static data points for a new traffic scenario. A static data point corresponds to a location of the new traffic scenario. The method includes ranking the static data points of the set of static data points based on the predicted error scores. The method further includes selecting a predetermined percentage of the ranked static data points having the highest predicted error scores of the ranked static data points. The method includes identifying locations of the new traffic scenario corresponding to the selected ranked static data points. The method includes collecting additional data points from the identified locations of the new traffic scenario. The method includes training a decoder for a neural network based on the additional data points.

20 Claims, 5 Drawing Sheets

(56) References Cited

OTHER PUBLICATIONS

Sergio Casas, Wenjie Luo, and Raquel Urtasun. Intentnet: Learning to predict intention from raw sensor data. In Conf. Robot Learn., pp. 947-956, 2018.
Yuning Chai, Benjamin Sapp, Mayank Bansal, and Dragomir Anguelov. Multipath: Multiple probabilistic anchor trajectory hypotheses for behavior prediction. arXiv preprint arXiv:1910.05449, 2019.
Kyunghyun Cho, Bart Van Merriënboer, Dzmitry Bahdanau, and Yoshua Bengio. On the properties of neural machine translation: Encoder-decoder approaches. arXiv preprint arXiv:1409.1259, 2014.
Chiho Choi and Behzad Dariush. Looking to relations for future trajectory forecast. In Proceedings of the IEEE/CVF International Conference on Computer Vision, pp. 921-930, 2019.
Kurtland Chua, Roberto Calandra, Rowan McAllister, and Sergey Levine. Deep reinforcement learning in a handful of trials using probabilistic dynamics models. Advances in neural information processing systems, 31, 2018.
Andreas Damianou and Neil D Lawrence. Deep gaussian processes. In Artificial intelligence and statistics, pp. 207-215. PMLR, 2013.
Chiyu Dong, John M Dolan, and Bakhtiar Litkouhi. Intention estimation for ramp merging control in autonomous driving. In IEEE Intell. Vehicles Symp. (IV), pp. 1584-1589. IEEE, 2017.
Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16x16 words: Transformers for image recognition at scale. arXiv preprint arXiv:2010.11929, 2020.
Angelos Filos, Panagiotis Tigkas, Rowan McAllister, Nicholas Rhinehart, Sergey Levine, and Yarin Gal. Can autonomous vehicles identify, recover from, and adapt to distribution shifts? In International Conference on Machine Learning, pp. 3145-3153. PMLR, 2020.
Jiyang Gao, Chen Sun, Hang Zhao, Yi Shen, Dragomir Anguelov, Congcong Li, and Cordelia Schmid. Vectornet: Encoding hd maps and agent dynamics from vectorized representation. In Proc. IEEE Conf. Comput. Vision and Pattern Recognit., pp. 11525-11533, 2020.
Jakob Gawlikowski, Cedrique Rovile Njieutcheu Tassi, Mohsin Ali, Jongseok Lee, Matthias Humt, Jianxiang Feng, Anna Kruspe, Rudolph Triebel, Peter Jung, Ribana Roscher, et al. A survey of uncertainty in deep neural networks. arXiv preprint arXiv:2107.03342, 2021.
Junru Gu, Chen Sun, and Hang Zhao. Densetnt: End-to-end trajectory prediction from dense goal sets. In Proceedings of the IEEE/CVF International Conference on Computer Vision, pp. 15303-15312, 2021.
Agrim Gupta, Justin Johnson, Li Fei-Fei, Silvio Savarese, and Alexandre Alahi. Social gan: Socially acceptable trajectories with generative adversarial networks. In Proc. IEEE Conf. Comput. Vision and Pattern Recognit., pp. 2255-2264, 2018.
Kaiming He, Xiangyu Zhang, Shaoqing Ren, and Jian Sun. Deep residual learning for image recognition. In Proc. IEEE Conf. Comput. Vision and Pattern Recognit., pp. 770-778, 2016.
Joey Hong, Benjamin Sapp, and James Philbin. Rules of the road: Predicting driving behavior with a convolutional model of semantic interactions. In Proc. IEEE Conf. Comput. Vision and Pattern Recognit., pp. 8454-8462, 2019.
Yedid Hoshen. Vain: Attentional multi-agent predictive modeling. In Adv. Neural Inf. Process. Syst., pp. 2701-2711, 2017.
Moksh Jain, Salem Lahlou, Hadi Nekoei, Victor Butoi, Paul Bertin, Jarrid Rector-Brooks, Maksym Korablyov, and Yoshua Bengio. Deup: Direct epistemic uncertainty prediction. arXiv preprint arXiv:2102.08501, 2021.
Siddhartha Jain, Ge Liu, Jonas Mueller, and David Gifford. Maximizing overall diversity for improved uncertainty estimates in deep ensembles. In Proceedings of the AAAI Conference on Artificial Intelligence, vol. 34, pp. 4264-4271, 2020.
Dietmar Kasper, Galia Weidl, Thao Dang, Gabi Breuel, Andreas Tamke, Andreas Wedel, and Wolfgang Rosenstiel. Object-oriented bayesian networks for detection of lane change maneuvers. IEEE Intell. Transp. Syst. Mag., 4(3):19-31, 2012.
Alex Kendall and Yarin Gal. What uncertainties do we need in bayesian deep learning for computer vision? Advances in neural information processing systems, 30, 2017.
Thomas Kipf, Ethan Fetaya, Kuan-Chieh Wang, Max Welling, and Richard Zemel. Neural relational inference for Interacting systems. arXiv preprint arXiv:1802.04687, 2018.
Thanard Kurutach, Ignasi Clavera, Yan Duan, Aviv Tamar, and Pieter Abbeel. Model-ensemble trust-region policy optimization. arXiv preprint arXiv:1802.10592, 2018.
Balaji Lakshminarayanan, Alexander Pritzel, and Charles Blundell. Simple and scalable predictive uncertainty estimation using deep ensembles. Advances in neural information processing systems, 30, 2017.
Balaji Lakshminarayanan, Dustin Tran, Jeremiah Liu, Shreyas Padhy, Tania Bedrax-Weiss, and Zi Lin. Simple and principled uncertainty estimation with deterministic deep learning via distance awareness. 2020.
Namhoon Lee, Wongun Choi, Paul Vernaza, Christopher B Choy, Philip HS Torr, and Manmohan Chandraker. Desire: Distant future prediction in dynamic scenes with interacting agents. In Proc. IEEE Conf. Comput. Vision and Pattern Recognit., pp. 336-345, 2017.
Jiachen Li, Hengbo Ma, and Masayoshi Tomizuka. Interaction-aware multi-agent tracking and probabilistic behavior prediction via adversarial learning. In IEEE Int. Conf. Robot. and Automat. (ICRA), pp. 6658-6664, 2019.
Xin Li, Xiaowen Ying, and Mooi Choo Chuah. Grip: Graph-based interaction-aware trajectory prediction. In IEEE Intell. Transp. Syst. Conf. (ITSC), pp. 3960-3966. IEEE, 2019.
Ilya Loshchilov and Frank Hutter. Decoupled weight decay regularization. arXiv preprint arXiv:1711.05101, 2017.
Yuexin Ma, Xinge Zhu, Sibo Zhang, Ruigang Yang, Wenping Wang, and Dinesh Manocha. Trafficpredict: Trajectory prediction for heterogeneous traffic-agents. In Proc. AAAI, vol. 33, pp. 6120-6127, 2019.
Andrey Malinin, Neil Band, German Chesnokov, Yarin Gal, Mark JF Gales, Alexey Noskov, Andrey Ploskonosov, Liudmila Prokhorenkova, Ivan Provilkov, Vatsal Raina, et al. Shifts: A dataset of real distributional shift across multiple large-scale tasks. arXiv preprint arXiv:2107.07455, 2021.
Srikanth Malla, Isht Dwivedi, Behzad Dariush, and Chiho Choi. Nemo: Future object localization using noisy ego priors. arXiv preprint arXiv:1909.08150, 2019.
Rowan McAllister, Yarin Gal, Alex Kendall, Mark Van Der Wilk, Amar Shah, Roberto Cipolla, and Adrian Weller. Concrete problems for autonomous vehicle safety: Advantages of bayesian deep learning. International Joint Conferences on Artificial Intelligence, Inc., 2017.
Jiquan Ngiam, Benjamin Caine, Vijay Vasudevan, Zhengdong Zhang, Hao-Tien Lewis Chiang, Jeffrey Ling, Rebecca Roelofs, Alex Bewley, Chenxi Liu, Ashish Venugopal, et al. Scene transformer: A unified architecture for predicting multiple agent trajectories. arXiv preprint arXiv:2106.08417, 2021.
Aleksey Postnikov, Aleksander Gamayunov, and Gonzalo Ferrer. Transformer based trajectory prediction. arXiv preprint arXiv:2112.04350, 2021.
Alexey Pustynnikov and Dmitry Eremeev. Estimating uncertainty for vehicle motion prediction on yandex shifts dataset. arXiv preprint arXiv:2112.08355, 2021.
Aravind Rajeswaran, Sarvjeet Ghotra, Balaraman Ravindran, and Sergey Levine. Epopt: Learning robust neural network policies using model ensembles. arXiv preprint arXiv:1610.01283, 2016.
Nicholas Rhinehart, Rowan McAllister, Kris Kitani, and Sergey Levine. Precog: Prediction conditioned on goals in visual multi-agent settings. In Proc. IEEE Conf. Comput. Vision and Pattern Recognit., pp. 2821-2830, 2019.
Amir Sadeghian, Vineet Kosaraju, Ali Sadeghian, Noriaki Hirose, Hamid Rezatofighi, and Silvio Savarese. Sophie: An attentive gan for predicting paths compliant to social and physical constraints. In Proc. IEEE Conf. Comput. Vision and Pattern Recognit., pp. 1349-1358, 2019.

(56) References Cited

OTHER PUBLICATIONS

Chen Sun, Per Karlsson, Jiajun Wu, Joshua B Tenenbaum, and Kevin Murphy. Stochastic prediction of multi-agent interactions from partial observations. arXiv preprint arXiv:1902.09641, 2019.
Lingfeng Sun, Wei Zhan, Di Wang, and Masayoshi Tomizuka. Interactive prediction for multiple, heterogeneous traffic participants with multi-agent hybrid dynamic bayesian network. In IEEE Intell. Transp. Syst. Conf. (ITSC), pp. 1025-1031. IEEE, 2019.
Pei Sun, Henrik Kretzschmar, Xerxes Dotiwalla, Aurelien Chouard, Vijaysai Patnaik, Paul Tsui, James Guo, Yin Zhou, Yuning Chai, Benjamin Caine, et al. Scalability in perception for autonomous driving: Waymo open dataset. In Proceedings of the IEEE/CVF conference on computer vision and pattern recognition, pp. 2446-2454, 2020.
Bohan Tang, Yiqi Zhong, Ulrich Neumann, Gang Wang, Siheng Chen, and Ya Zhang. Collaborative uncertainty in multi-agent trajectory forecasting. Advances in Neural Information Processing Systems, 34, 2021.
Ekaterina Tolstaya, RezaMahjourian, Carlton Downey, Balakrishnan Vadarajan, Benjamin Sapp, and Dragomir Anguelov. Identifying driver interactions via conditional behavior prediction. In 2021 IEEE International Conference on Robotics and Automation (ICRA), pp. 3473-3479. IEEE, 2021.
Ashish Vaswani, Noam Shazeer, Niki Parmar, Jakob Uszkoreit, Llion Jones, Aidan N Gomez, Łukasz Kaiser, and Illia Polosukhin. Attention is all you need. Advances in neural information processing systems, 30, 2017.
Petar Veličković, Guillem Cucurull, Arantxa Casanova, Adriana Romero, Pietro Lio, and Yoshua Bengio. Graph attention networks. arXiv preprint arXiv:1710.10903, 2017.
Anirudh Vemula, Katharina Muelling, and Jean Oh. Social attention: Modeling attention in human crowds. In IEEE Int. Conf. Robot. and Automat. (ICRA), pp. 1-7. IEEE, 2018.
Benjamin Wilson, William Qi, Tanmay Agarwal, John Lambert, Jagjeet Singh, Siddhesh Khandelwal, Bowen Pan, Ratnesh Kumar, Andrew Hartnett, Jhony Kaesemodel Pontes, et al. Argoverse 2: Next generation datasets for self-driving perception and forecasting. 2021.

\* cited by examiner

SYSTEMS AND METHODS FOR UNCERTAINTY ESTIMATION IN VEHICLE TRAJECTORY PREDICTION

BACKGROUND

Vehicle trajectory prediction has a pivotal role in autonomous driving scenarios. The operation of an autonomous vehicle system may access an accurate trajectory prediction of the surrounding traffic participants, such that the following decision-making, planning, and control modules may guarantee efficient operation with a high probability. Several approaches have been proposed to solve the vehicle trajectory prediction with different traffic participants such as vehicles and pedestrians. Probabilistic inference approach such as graphical models and dynamic Bayesian network have been used. However, these approaches require the detailed predictor design of a given predictor to provide an analysis of the importance of different features, i.e., static information (maps, traffic rules, etc.) and agent information (traffic participants' positions, velocities, etc.).

BRIEF DESCRIPTION

In one embodiment, a system for uncertainty estimation in vehicle trajectory prediction is provided. The system may include a processor and a memory storing instructions. When executed by the processor, the instructions may cause the processor to calculate predicted error scores for each static data point of a set of static data points for a new traffic scenario. A static data point may correspond to a location of the new traffic scenario. When executed by the processor, the instructions may also cause the processor to rank the static data points of the set of static data points based on the predicted error scores. Ranked static data points may be ranked from a lowest predicted error score to a highest predicted error score. When executed by the processor, the instructions may further cause the processor to select a predetermined percentage of the ranked static data points having the highest predicted error scores of the ranked static data points. When executed by the processor, the instructions yet may further cause the processor to identify locations of the new traffic scenario corresponding to the selected ranked static data points. When executed by the processor, the instructions may cause the processor to collect additional data points from the identified locations of the new traffic scenario. When executed by the processor, the instructions may also cause the processor to train a decoder for a neural network based on the additional data points.

According to another aspect, a method for uncertainty estimation in vehicle trajectory prediction is provided. The method may include calculating predicted error scores for each static data point of a set of static data points for a new traffic scenario. A static data point may correspond to a location of the new traffic scenario. The method also may include ranking the static data points of the set of static data points based on the predicted error scores. Ranked static data points may be ranked from a lowest predicted error score to a highest predicted error score. The method may further include selecting a predetermined percentage of the ranked static data points having the highest predicted error scores of the ranked static data points. The method yet may further include identifying locations of the new traffic scenario corresponding to the selected ranked static data points. The method may include collecting additional data points from the identified locations of the new traffic scenario. The method may also include training a decoder for a neural network based on the additional data points.

According to yet another aspect, a non-transitory for uncertainty estimation in vehicle trajectory prediction is provided. The non-transitory computer readable storage medium may store instructions that when executed by a computer having a processor performs a method. The method may include calculating predicted error scores for each static data point of a set of static data points for a new traffic scenario. A static data point may correspond to a location of the new traffic scenario. The method may also include ranking the static data points of the set of static data points based on the predicted error scores. Ranked static data points may be ranked from a lowest predicted error score to a highest predicted error score. The method may further include selecting a predetermined percentage of the ranked static data points having the highest predicted error scores of the ranked static data points. The method may yet further include identifying locations of the new traffic scenario corresponding to the selected ranked static data points. The method may include collecting additional data points from the identified locations of the new traffic scenario. The method may also include training a decoder for a neural network based on the additional data points.

DETAILED DESCRIPTION

Uncertainty estimation has been investigated for decades in different areas, such as computer vision, natural language processing, etc. There has also been some existing work focusing on how to obtain confidence score per predicted trajectories. However, such work may only provide the relative confidence given the predicted possible future trajectories, and thus, cannot provide confidence for a single case, especially when the single case is out-of-distribution.

Although several approaches have been proposed and evaluated on a dataset by using different uncertainty quantification techniques, such as gaussian process, ensemble models, and direct error prediction, these approaches do not provide experiment results about how different features contribute to uncertainty estimation. Also, the uncertainty estimation procedure in these approaches is typically incorporated with specialized predictors.

Here, the systems and methods for uncertainty estimation in vehicle trajectory prediction may include a direct-error-prediction-based uncertainty estimation framework, which does not require the detailed predictor design of a specialized predictor, to provide an analysis of the importance of different features, i.e., the set of static data points (maps, traffic rules, etc.) and agent information (traffic participants' positions, velocities, etc.). The systems and methods include a generic error-prediction-based uncertainty estimation framework that may be utilized with any generic (i.e., black-box) predictors. A data selection algorithm may be further provided that leverages the set of static data points. The data selection may be based on an evaluation of features having determined significance for uncertainty estimation in the vehicle trajectory prediction application. By using the systems and methods described herein, a detailed analysis of uncertainty estimation in the vehicle trajectory prediction application is provided.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein is a self-propelled machine that moves through or manipulates an environment. Exemplary agents may include, but is not limited to, robots, vehicles, or other self-propelled machines. The agent may be autonomously, semi-autonomously, or manually operated.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the agents such as the first agent 130 and/or the second agent 132, driving, and/or operation. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

I. System Overview

Figure 1:
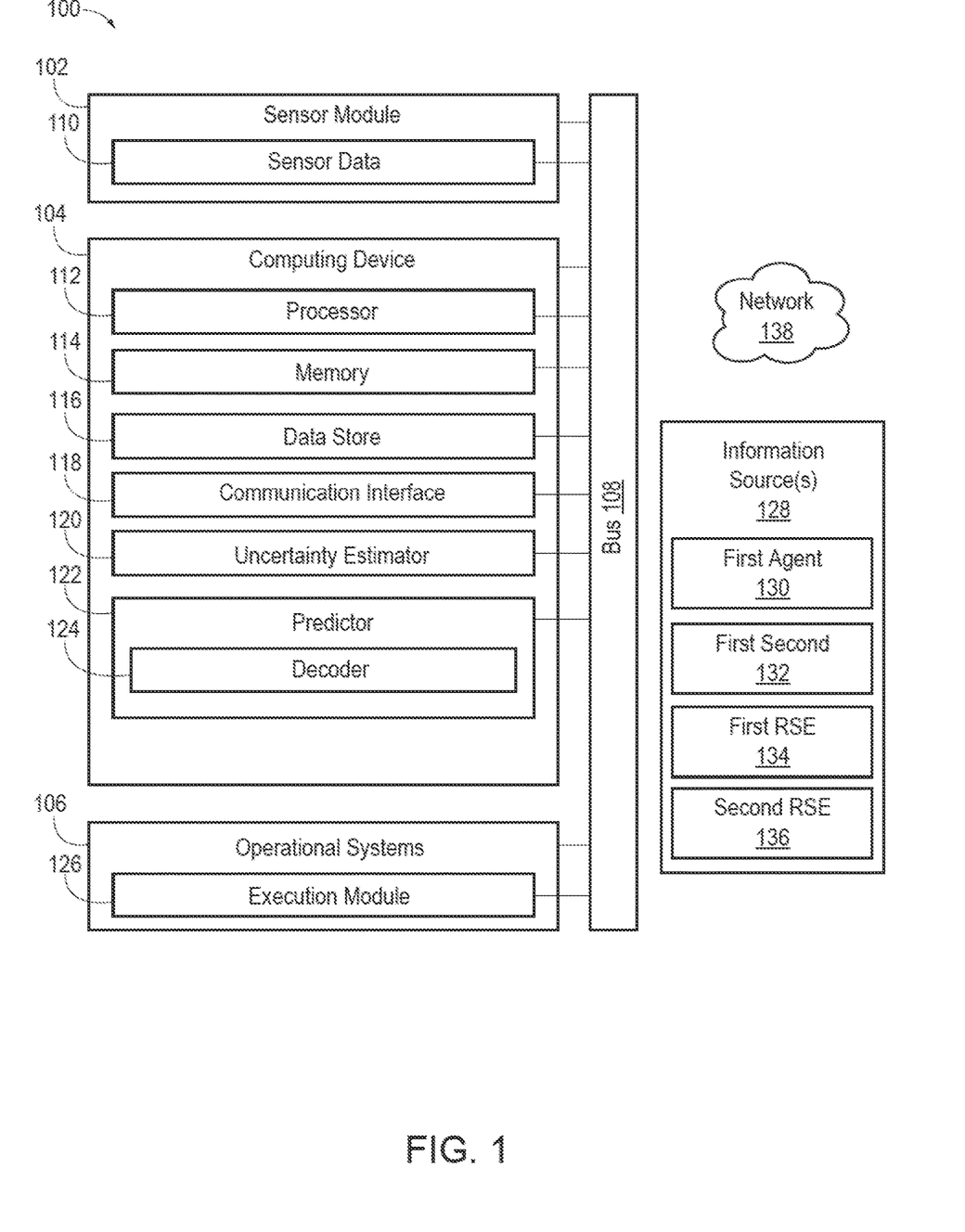
FIG. 1 is an exemplary component diagram of a system for uncertainty estimation in vehicle trajectory prediction, according to one aspect.

Referring now to the drawings, the drawings are for purposes of illustrating one or more exemplary embodiments and not for purposes of limiting the same. FIG. 1 is an exemplary illustration of a component diagram of an operating environment 100 for uncertainty estimation in vehicle trajectory prediction, according to one aspect. The operating environment 100 for uncertainty estimation in vehicle trajectory prediction of FIG. 1 may be implemented as a part of a neural network.

The computing device 104 may be implemented as a part of an ego agent, such as a first agent 130 or a second agent 132. An agent may be a bipedal, two-wheeled or four-wheeled robot, a vehicle, or a self-propelled machine. For example, in another embodiment, the ego agent may be configured as a humanoid robot. The ego agent may take the form of all or a portion of a robot. In a vehicular embodiment, the ego agent may be a vehicle configured to operate on a roadway. The computing device 104 may be implemented as part of a telematics unit, a head unit, a navigation unit, an infotainment unit, an electronic control unit, among others of the ego agent.

Figure 2:
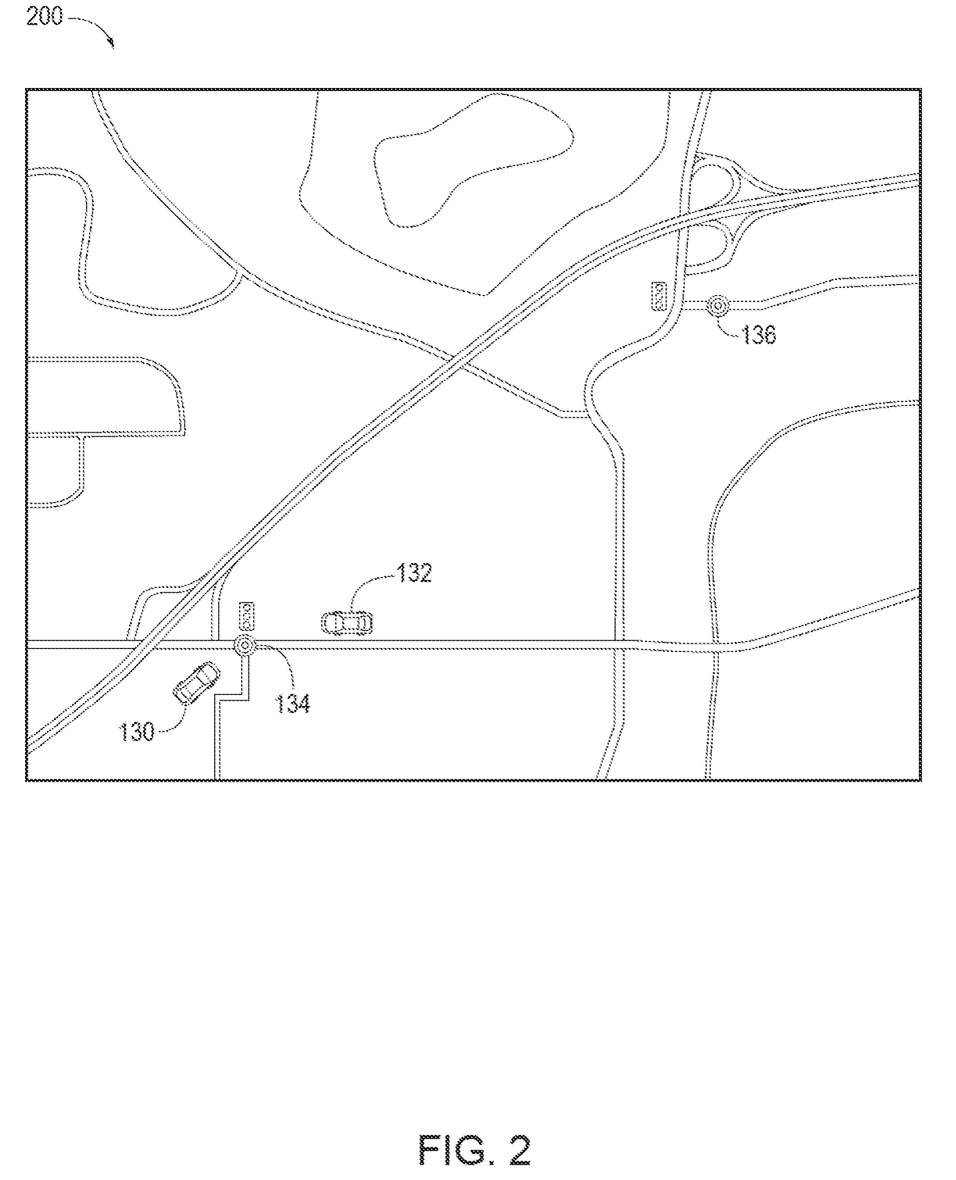
FIG. 2 is an exemplary process flow for uncertainty estimation in vehicle trajectory prediction, according to one aspect.

An agent, such as the first agent 130 and/or the second agent 132, may include sensors for sensing objects and the environment 200. For example, the first agent 130 may include an image sensor (not shown). The image sensor may be a light sensor to capture light data from around the first agent 130. The light sensor may rotate 360° degrees around first agent 130 and collect the sensor data 110 in sweeps. Conversely, an image sensor may be omnidirectional and collect sensor data 110 from all directions simultaneously. The image sensor of an agent may emit one or more laser beams of ultraviolet, visible, or near infrared light toward the surrounding environment of the first agent 130.

In other embodiments, the components and functions of the computing device 104 may be implemented with other devices (e.g., a portable device) or another device connected via a network (e.g., a network 138). Additionally or alternatively, the computing device 104 may be implemented as a part of road side equipment (RSE). For example, turning to FIG. 2, the environment 200 may include a roadway infrastructure that is operably connected to a road side equipment unit (RSE) such as a first RSE 134 and a second RSE 136 that may be used to sense information about the environment 200 such as the position, velocity, and acceleration of the first agent 130 and/or the second agent 132.

The RSE may be configured to communicate with other RSE and/or agents. The RSE may additionally be configured to communicate indirectly and/or directly through one or more wireless communications protocols to send and receive data to and from the computing devices 104. The RSE may be physically connected to or may be included as part of the roadway infrastructure such as street lights, traffic lights, road signs, and the like that are located within the environment 200. For example, the RSE may be located with roadway infrastructure for at least one roadway (e.g., at or near an intersection, on/off ramp) of the environment 200. In some embodiments, the roadway infrastructure may also include infrastructure that may be located near a vicinity of the at least one roadway (e.g., cellular towers, buildings, utility poles, bridges, tunnels, and the like).

The RSE captures the sensor data 110 that applies to the environment 200. In one embodiment, the RSE may include a control unit (not shown) that may process and compute functions associated with the components of the RSE. Generally, the control unit may include a respective processor (not shown), a respective memory (not shown), a respective disk (not shown), and a respective input/output (I/O) interface (not shown), which are each operably connected for computer communication. The I/O interfaces provide software and hardware to facilitate data input and output between the components of the computing device 104 and other components, networks, and data sources, of the environment 100.

The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

The computing device 104 may include a processor 112, a memory 114, a data store 116, and a communication interface 118, which are each operably connected for computer communication via a bus 108 and/or other wired and wireless technologies. The communication interface 118 may provide software and hardware to facilitate data input and output between the components of the computing device 104 and other components, networks, and data sources, which will be described herein. Additionally, the computing device 104 may also include an uncertainty estimator 120 and a predictor 122 having a decoder 124 for uncertainty estimation in vehicle trajectory facilitated by the components of the operating environment 100.

The uncertainty estimator 120, the predictor 122, and/or the decoder 124 may be implemented as an artificial neural network or with artificial neural networks that act as a framework for machine learning, including deep reinforcement learning. For example, the uncertainty estimator 120, the predictor 122, and/or the decoder 124 may be a convolution neural network (CNN). In one embodiment, the uncertainty estimator 120, the predictor 122, and/or the decoder 124 may include a conditional generative adversarial network (cGAN). In some embodiments, the uncertainty estimator 120, the predictor 122, and/or the decoder 124 may be trained or used to train neural networks for uncertainty estimation in vehicle trajectory.

The computing device 104 may also be operably connected for computer communication (e.g., via the bus 108 and/or the communication interface 118) to one or more operational systems 106. The operational systems 106 may include, but are not limited to, any automatic or manual systems that may be used to enhance the operation and/or propulsion of the first agent 130. The operational systems 106 may include an execution module 128. The execution module 128 monitors, analyses, and/or operates the first agent 130, to some degree. For example, the execution module 128 may store, calculate, and provide directional information and facilitate features like vectoring and obstacle avoidance among others. The execution module 128 may provide operational data to agent systems, such as the steering system, that cause the first agent 130 to operate autonomously. In some embodiments, the execution module 128 may be a Proportional, Integral, Derivative (PID) controller. The operational systems 106 may be dependent on the implementation.

The operational systems 106 may also include and/or are operably connected for computer communication to the sensor module 102. For example, one or more sensors of the sensor module 102, may be incorporated with the execution module 128 to monitor characteristics of the environment 200 or the first agent 130 itself. The uncertainty of the vehicle trajectory of the second agent 132 may be predicted so that the execution module 128 may determine avoidance paths for the first agent 130.

The sensor module 102, the computing device 104, and/or the operational systems 106 may also be operatively connected for computer communication to the network 138. The network 138 is, for example, a data network, the Internet, a wide area network (WAN) or a local area (LAN) network. The network 138 serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Uncertainty Estimation

Figure 3:
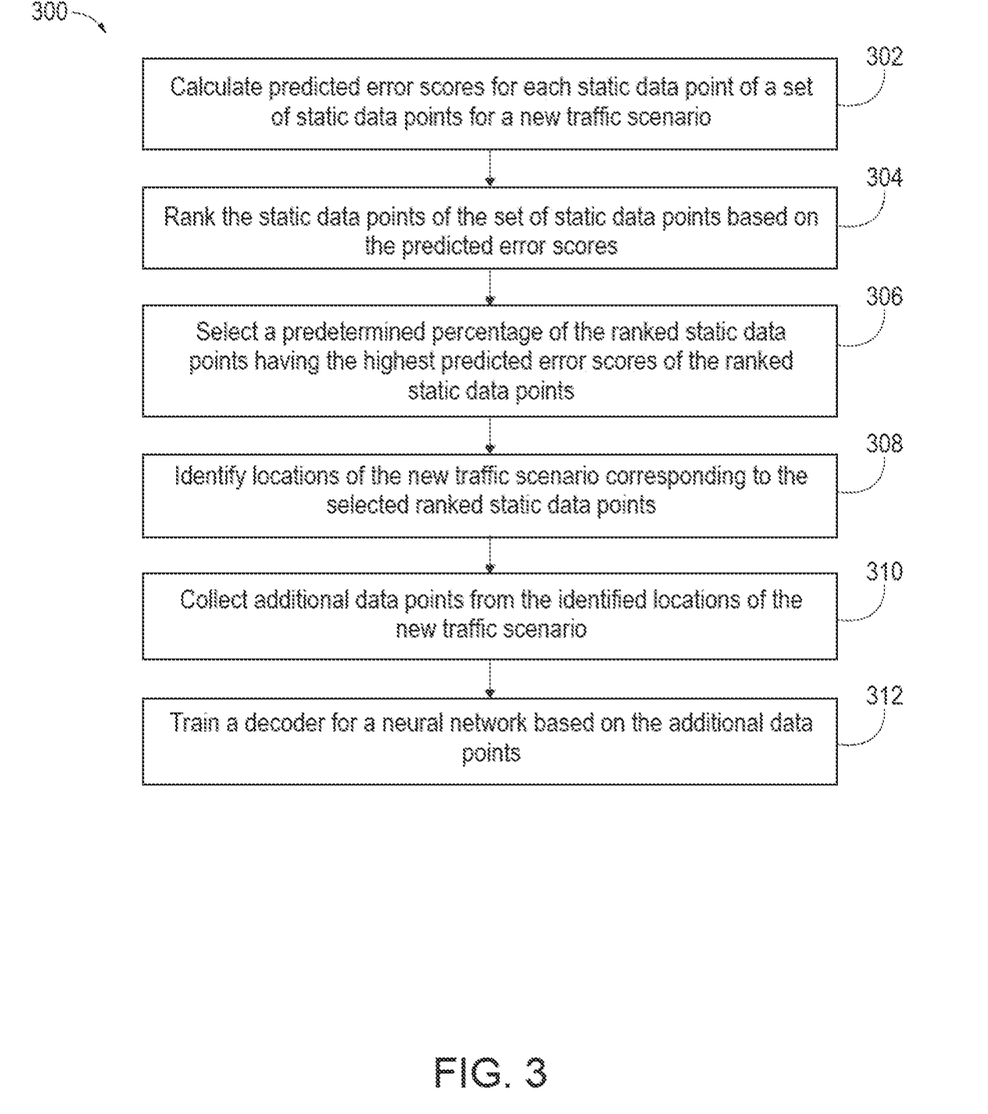
FIG. 3 is an example framework architecture for uncertainty estimation in vehicle trajectory prediction, according to one aspect.

Referring now to FIG. 3, a method 300 for uncertainty estimation in vehicle trajectory prediction will now be described according to an exemplary embodiment. FIG. 3 will also be described with reference to FIGS. 1, 3, 4, and 5. For simplicity, the method 300 will be described as a sequence of elements, but it is understood that the elements of the method 300 may be organized into different architectures, blocks, stages, and/or processes.

At block 302, the method 300 includes calculating predicted error scores for each static data point of a set of static data points 402 for a new traffic scenario, such as for the environment 200. The set of static data points 402 includes information from locations in the environment 200. The set of static data points 402 includes information that is rule-based or is fixed. The set of static data points may include traffic rule information, such as traffic signals that have a fixed pattern. The set of static data points 402 may be obtained directly from the relevant RSE, such as the first RSE 134 and the second RSE 136. In another embodiment, a static data point of the set of static data points 402 may correspond to a location of the environment 200 and be received from an RSE at that location. In this manner, the set of static data points may be captured without deploying data collection devices, such as the first agent 130 and the second agent 132. Accordingly, the set of static data points 402 may be non-agent static data.

Figure 4:
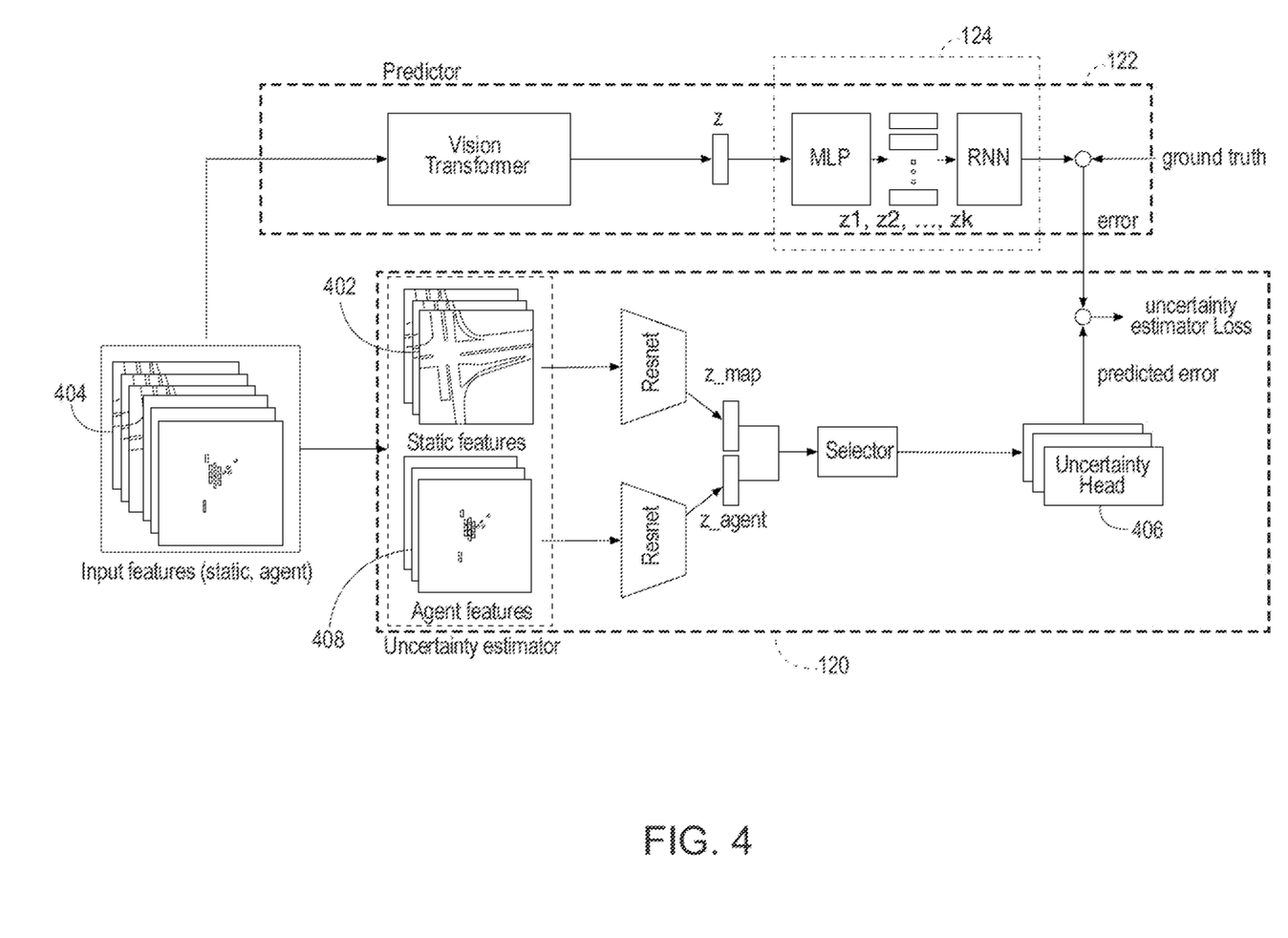
FIG. 4 is an illustration of an example computer-readable medium or computer-readable device including processor-executable instructions configured to embody one or more of the provisions set forth herein, according to one aspect.

The set of static data points may include map information for the environment 200. A static data point may correspond to a location of the new traffic scenario of the environment 200. Turning to FIG. 4, the uncertainty estimation framework 400 may include the predictor 122 for predicting confidence for trajectories of agents in the environment 200. When the predictor 122 has not been trained for the environment 200, the environment 200 is a new traffic scenario for the predictor 122. The training of the predictor may be fine-tuning the predictor 122 based on the new traffic scenario. The map information is representation of the environment 200 identifying physical features (e.g. cities, roadways, walkways, etc.) and the relative position of the physical features. The map information may further include traffic patterns for the environment 200.

The set of static data points 402 may further include historical information $X \in \mathbb{R}^{d_x \times H \times W}$ in the image format, where H and W are the height and width, respectively, and $d_x$ is the number of features. Further, $X_S \in \mathbb{R}^{d_s \times H \times W}$, $X_\alpha \in \mathbb{R}^{d_\alpha \times H \times W}$, where $X_S$ denotes the set of static data points 402, and $X_\alpha$ denotes the agent information. The $T_f$-time-step future trajectories as $Y=[y_1, y_2, \ldots y_{T_f}]$ where $y_t \in \mathbb{R}^2$ is the position of an agent at time step t.

In one embodiment, a vision transformer may be used as an encoder to determine the latent representation $z = \mathbb{R}^d$ of the set of static data points 402. For example, where the set of static data points 402 are historical observations X, then z=ViT(X). Once the latent representation z is determined, a Gaussian mixture model (GMM) may be used a decoder. Specifically, the latent variable z are projected into k different variables $\hat{z}_{i=1:k}$ by using a feed-forward neural network $\Pi$:

$$[vec(\check{Z})^T, vec(W(z))^T]^T = \Pi(z)$$

$$\check{Z}[\check{z}_1, \check{z}_2, \ldots \check{z}_k] \in \mathbb{R}^{d \times k}, \ W(z) = [w_1(z), w_2(z), \ldots$$

$$w_k(z)] \in \mathbb{R}^{1 \times k}$$

which outputs the predicted error scores $w_i(z)$ for each static data point, given as $\tilde{z}_i$ of a set of static data points 402. The mean of the predicted trajectories $\mu_i(z)$ may be calculated using a recurrent neural network, according to:

$$Y \sim Q = \sum_{i=1}^{k} \omega_i \mathcal{N}(\mu_i(z), \Sigma_j(z))$$

$$h_t^i = GRU([\mu(z)_{t-1}^i, \check{z}_i]), \ \mu(z)_t^i = MLP(h_t^i), \ \forall \ t = 1, 2, \ldots, T_f$$

where h is the state variable of GRU cell and $\Sigma$ is set equal to the identity matrix.

At block 304, the method 300 includes ranking the static data points of the set of static data points 402 based on the predicted error scores. Ranked static data points are ranked from a lowest predicted error score to a highest predicted error score, such that the sorted $\tilde{\epsilon}_{sorted} = \{(X_{s,[i]}, u_{[i]})\}_{i=1:n}$, where $u_{[i]} \geq u_{[i+1]}$, where $\forall_i =$', ..., n−1.

At block 306, the method 300 includes selecting a predetermined percentage of the ranked static data points having the highest predicted error scores of the ranked static data points. For example, the top-k of the ranked static data points are given by $E_{static}$, where k=[rn]. The predetermined percentage may include 20%-50% of the ranked static data points having the highest predicted error scores of the ranked static data points.

At block 308, the method 300 includes identifying locations of the new traffic scenario corresponding to the selected ranked static data points. As discussed above, each static data point corresponds to a location of the new traffic scenario of the environment 200. If a selected ranked static data point corresponds to a first location 208 of the environment 200, then the first location 208 is identified. Likewise, if another selected ranked static data point corresponds to a second location 210 of the environment 200, then the second location 210 is identified.

At block 310, the method 300 includes collecting additional data points from the identified locations of the new traffic scenario. Thus, according to the selected ranked static data points the locations of relevant data may be identified for training the decoder. In one embodiment, the RSE corresponding to the identified locations may collect additional data points. For example, if the first location 208 is identified, and the first agent 130 is associated with the first location 208, then the first RSE may collect additional data points regarding the first location 208. Alternatively, agents in the area, such as the first agent 130 may capture additional data regarding the first location 208. In this manner, the locations with relevant data may be identified before deploying resources, such as agents to collect sensor data 110 from those locations. The sensor data may be received by the sensor module 102.

In this manner, the selected ranked static data points provide useful insight into the locations that resources, such as agents, should be deployed. The additional information includes information from dynamic sources, such as the agents, the correlation between the set of static data points 402, and the dynamic data 408 which may be utilized. For instance, when there are many agents in one location, the position of agents infers the dynamic data 408 of the environment 200. For example, if a number of agents are in a first lane, this may indicate an obstacle in the second lane. Accordingly, the additional information may include both static data and dynamic data 408 collected from locations that are identified based on static data alone.

At block 312, the method 300 includes training a decoder 124 of the predictor 122 that is a neural network based on the additional data points. The objective of trajectory prediction is to estimate the distribution $\rho(Y|X)$. The uncertainty estimator 120 may calculate predicted error scores for each static data point of the set of static data points 402 for a new traffic scenario. For example, the uncertainty estimator 120 may analyze the importance of different regimes of features for uncertainty estimation using a feature extractor to choose different regimes of latent representations of features. The features from different regimes, such as static features from the static data points, for example, the static features $X_S$ and $X_a$, may be encoded by a residual neural network (ResNet) with different parameters:

$$z_s = ResNet(X_S; \psi_S), \ z_a = ResNet(X_S; \psi_a), \ enc(X) = S(z_s, z_a)$$

where $\psi_S$ and $\psi_a$ are the parameters of ResNet, respectively. S is defined as a function of $z_S$ and $z_a$. It may be $S(z_S; z_a) = z_s$ or $S(z_S; z_a)=z_a$ which represents static information-based uncertainty estimation and agent information based uncertainty estimation. It may also be a combination of different information such as $S(z_S; z_a)=z_s+z_a$. In particular, the set of static data points 402 may be represented as $D_S=\{X_S,i\}_{i=1:n}$ in the new traffic scenario.

Once the latent embedding enc(X) is determined, an ensemble of feed-forward neural networks may act as an uncertainty projection module to determine:

$$\hat{e}^i(x) = h(z(x), \theta_i) i = 1, \ldots, M; u(X) = \frac{1}{M}\sum_{i=1}^{M}\hat{e}^i(X)$$

where $\theta_i$ represents i-th parameter. M is the number of ensembles, such that the mean of the ensembles is the uncertainty score u(X). The uncertainty scores $u_i$ for each static data point of the set of static data points 402 is calculated by the uncertainty estimator for each $X_{s,i}$.

In one embodiment, the set of static data points 402 includes the sensor data 110. The sensor data 110 may include input images 404, shown in FIG. 4, of the environment 200. The input images 404 may be received from the first agent 130, the second agent 132, the first RSE 134, and/or the second RSE 136. A neural network, such as ResNet, is used as an encoder. A first convolutional layer may be modified in order to fit the input image 404 for the uncertainty estimator 120. If the number of ensembles M=3, then, for each uncertainty head 406, we use a feed-forward network with hidden sizes, such as 512, 256, 128. The latent variable's dimension for the uncertainty estimator may be 128. For the uncertainty estimation loss, a scale s=⅓₀₀, and the $e_{upp}=10000$ may be used. For the uncertainty estimator training, an optimizer may be used.

In one embodiment, the set of static data points 402 may be sorted based on the predicted error scores as a prediction loss function using a corrected negative loglikelihood (cNLL). The prediction loss function may be represented as:

$$\mathcal{L}_{cNLL}(x, y; Q) = -\log\sum_{i=1}^{k}\omega_i(x)\prod_{t=1}^{T}N\left(y_t \mid \mu_t^i(x), \sum_t x\right) +$$
$$\frac{1}{2}T\log2\pi\left|\sum(x)\right|$$
$$= -\log\sum_{i=1}^{k}\omega_i(x)e^{-\frac{1}{2}\sum_{t=1}^{T}(y_t-\mu_t^i(x))^T\Sigma^{-1}(x)(y_t-\mu_t^i(x))}$$

where Q represents the learned GMM. The prediction loss function may capture multi-modality compared with weighted average displacement error (wADE). The cNLL metric will be used in both the training and testing procedure. For the variance, Σ, we set it as an identical matrix. In one embodiment, uncertainty estimation is directly predicted as error. The corrected negative log-likelihood may be used as the supervised signal for uncertainty estimation. Considering the optimal solution ê* of the following optimization:

$$\min_{\hat{e}}\mathbb{E}_{X\sim P_X}\mathbb{E}_{Y|X\sim P_{Y|X}}[(cNLL(Y|X)-\hat{e}(X))^2],$$

$$\hat{e}^*(x)=\mathbb{E}_{Y|x\sim P_{Y|x}}[cNLL(Y|x)]=\mathcal{H}(P_{Y|x})+D_{KL}[P_{Y|x}||Q]+C,$$

where C is a constant. P represents the ground truth distribution. Q is the learned Gaussian mixture model. When the learned distribution Q is the same as the ground truth distribution, then the optimal uncertainty estimator ê* will be the entropy of P added a constant, i.e., $\mathcal{H}(P)+C$. If there is no distributional shift and Q=P, then ê*−C will represent the aleatoric uncertainty. The divergence between P and Q may represent the model uncertainty. Mean squared error loss for cNLL is given as:

$$\mathcal{L}_{unc}(e|\hat{e})=(s\cdot clip(e,0,e_{upp})-\hat{e})^2$$

where s is the scale of error and $e_{upp}$ is the upper bound of the clip value. The normalization process makes the training procedure more stable.

The systems and methods described herein provide a generic direct error-prediction-based uncertainty estimation. In one embodiment, the direct error-prediction-based uncertainty estimation framework 400 may be used for agent trajectory prediction, such as vehicle trajectory prediction. The error-prediction-based uncertainty estimation framework 400 does not require the detail of design of the predictor 122. For example, in the vehicular embodiment, the error-prediction-based uncertainty estimation framework 400 does not require the detail of the predictor's design so that the predictor 122 may be used for a third party, such as a regular department or insurance company, to evaluate autonomous driving companies' prediction products. Meanwhile, in order to investigate how the different feature attributes influence the uncertainty estimation, the features are analyzed in an ablative way. The systems and methods described herein are meaningful for several downstream tasks, such as transfer learning, active learning, and continual learning, since the static data 402 may be obtained with much less budget than collecting agent dynamic data 408.

Figure 5:
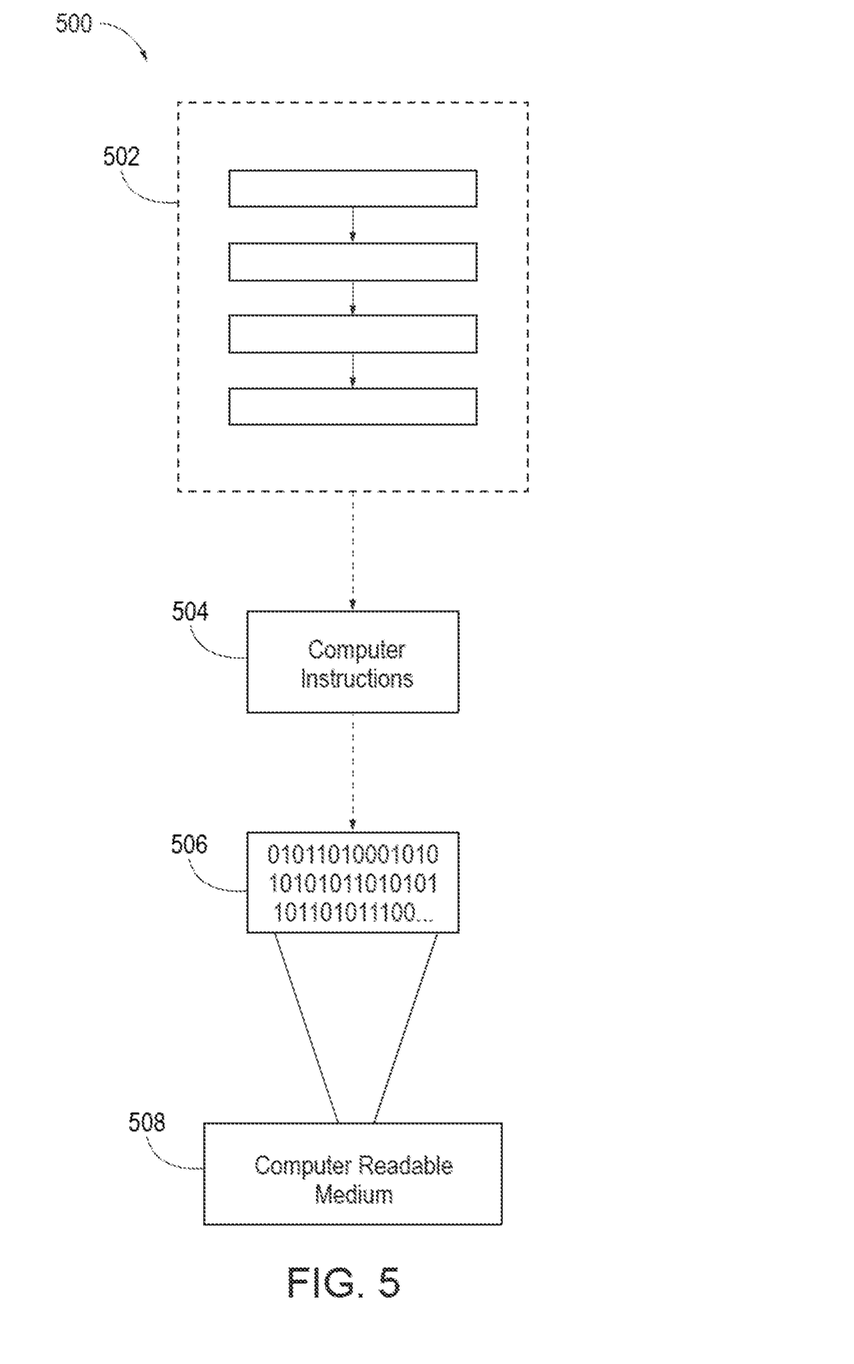
FIG. 5 is an illustration of an example computing environment where one or more of the provisions set forth herein are implemented, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 300 of FIG. 3. In another aspect, the processor-executable computer instructions 504 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for uncertainty estimation in vehicle trajectory prediction, comprising:
a processor; and
a memory storing instructions that when executed by the processor cause the processor to:
calculate via a vision transformer encoder and a decoder, predicted error scores for each static data point of a set of static data points for a new traffic scenario, wherein a static data point corresponds to a location of the new traffic scenario;
rank the static data points of the set of static data points based on the predicted error scores, wherein ranked static data points are ranked from a lowest predicted error score to a highest predicted error score;
select a predetermined percentage of the ranked static data points having the highest predicted error scores of the ranked static data points;
identify locations of the new traffic scenario corresponding to the selected ranked static data points;
collect additional data points from the identified locations of the new traffic scenario by autonomously controlling at least one sensor equipped agent to traverse to at least one of the identified locations or by autonomously controlling at least one sensor equipped road-side equipment at an identified location of the identified locations to collect sensor data; and
train the decoder for a neural network based on the additional data points.

2. The system of claim 1, wherein the set of static data points includes information from locations that is rule-based or has a fixed pattern.

3. The system of claim 1, wherein the static data point of the location of the new traffic scenario is received from road-side equipment at the location.

4. The system of claim 1, wherein the predicted error scores are calculated based on different regimes of latent representations of features of the set of static data points.

5. The system of claim 1, wherein the predetermined percentage of the ranked static data points is 50% or less of the set of static data points.

6. The system of claim 1, wherein training the decoder includes fine-tuning the neural network.

7. The system of claim 1, wherein an uncertainty estimator calculates the predicted error scores and a predictor includes the decoder, and wherein the predictor is configured to calculate a confidence score for a given prediction.

8. A method for uncertainty estimation in vehicle trajectory prediction, comprising:
calculating, via a vision transformed encoder and a decoder predicted error scores for each static data point of a set of static data points for a new traffic scenario, wherein a static data point corresponds to a location of the new traffic scenario;
ranking the static data points of the set of static data points based on the predicted error scores, wherein ranked static data points are ranked from a lowest predicted error score to a highest predicted error score;
selecting a predetermined percentage of the ranked static data points having the highest predicted error scores of the ranked static data points;
identifying locations of the new traffic scenario corresponding to the selected ranked static data points;
collect additional data points from the identified locations of the new traffic scenario by autonomously controlling at least one sensor equipped agent to traverse to at least one of the identified locations or by autonomously controlling at least one sensor equipped road-side equipment at an identified location of the identified locations to collect sensor data; and
training s the decoder for a neural network based on the additional data points.

9. The method of claim 8, wherein the set of static data points includes information from locations that is rule-based or has a fixed pattern.

10. The method of claim 8, wherein the static data point of the location of the new traffic scenario is received from road-side equipment at the location.

11. The method of claim 8, wherein the predicted error scores are calculated based on different regimes of latent representations of features of the set of static data points.

12. The method of claim 8, wherein the predetermined percentage of the ranked static data points is 50% or less of the set of static data points.

13. The method of claim 8, wherein training the decoder includes finetuning the neural network.

14. The method of claim 8, further comprising:
calculating a confidence score for a given prediction based on the neural network of the trained decoder.

15. A non-transitory computer readable storage medium storing instructions that when executed by a computer having a processor to perform a method for uncertainty estimation in vehicle trajectory prediction, the method comprising:
calculating, via a vision transformer encoder and a decoder predicted error scores for each static data point of a set of static data points for a new traffic scenario, wherein a static data point corresponds to a location of the new traffic scenario;
ranking the static data points of the set of static data points based on the predicted error scores, wherein ranked static data points are ranked from a lowest predicted error score to a highest predicted error score;
selecting a predetermined percentage of the ranked static data points having the highest predicted error scores of the ranked static data points;
identifying locations of the new traffic scenario corresponding to the selected ranked static data points;
collect additional data points from the identified locations of the new traffic scenario by autonomously controlling at least one sensor equipped agent to traverse to at least one of the identified locations or by autonomously controlling at least one sensor equipped road-side equipment at an identified location of the identified locations to collect sensor data; and
training the decoder for a neural network based on the additional data points.

16. The non-transitory computer readable storage medium of claim 15, wherein the set of static data points includes information from locations that is rule-based or has a fixed pattern.

17. The non-transitory computer readable storage medium of claim 15, wherein the static data point of the location of the new traffic scenario is received from road-side equipment at the location.

18. The non-transitory computer readable storage medium of claim 15, wherein the predicted error scores are calculated based on different regimes of latent representations of features of the set of static data points.

19. The non-transitory computer readable storage medium of claim 15, wherein the predetermined percentage of the ranked static data points is 50% or less of the set of static data points.

20. The non-transitory computer readable storage medium of claim 15, wherein training the decoder includes finetuning the neural network.

* * * * *